United States Patent
Da Silva et al.

(10) Patent No.: US 9,863,431 B2
(45) Date of Patent: Jan. 9, 2018

(54) HYBRID MAGNETIC SUSPENSION OF A ROTOR

(71) Applicant: Aktiebolaget SKF, Göteborg (SE)

(72) Inventors: Joaquim Da Silva, Sennely (FR); Yves Dupuis, Saint-Just (FR); Olivier Lemarchand, Guichainville (FR); Lateb Ramdane, Vernon (FR); Erwan Salahun, Groix (FR); Ulrich Schroeder, Mont-Saint-Aignan (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 354 days.

(21) Appl. No.: 14/140,676

(22) Filed: Dec. 26, 2013

(65) Prior Publication Data
US 2014/0199179 A1 Jul. 17, 2014

(30) Foreign Application Priority Data
Dec. 26, 2012 (EP) ..................... 12306674

(51) Int. Cl.
*F04D 29/058* (2006.01)
*F16C 32/04* (2006.01)
(Continued)

(52) U.S. Cl.
CPC ........... *F04D 29/058* (2013.01); *F04D 25/16* (2013.01); *F16C 32/0425* (2013.01);
(Continued)

(58) Field of Classification Search
CPC .. F04D 13/0633; F04D 13/024; F04D 29/048; F04D 29/058; H02K 7/09; H02K 21/14; H02K 21/145; F16C 32/044; F16C 32/0474; F16C 39/063; F05D 2240/51; F05D 2240/511; F05D 2246/51; F05D 2246/511; Y10T 464/30
(Continued)

(56) References Cited

U.S. PATENT DOCUMENTS

| 6,700,259 B1 * | 3/2004 | Lin ...................... F16C 32/0442 310/90.5 |
| 2003/0170132 A1 * | 9/2003 | Englander ............. F04D 19/042 417/423.4 |

(Continued)

*Primary Examiner* — Kenneth J Hansen
(74) *Attorney, Agent, or Firm* — Bryan Peckjian; SKF USA Inc. Patent Dept.

(57) ABSTRACT

A hybrid magnetic suspension of a rotor (1) having compressor wheels (2, 3) having permanent magnets (104, 114) integral to shrunk fit rings (8, 18) arranged on the rotor (1) in the vicinity of the compressor wheels (2, 3), permanent magnets (124, 134) integral to stationary rings (23, 33) coaxially arranged with the rotor (1) and associated with a resilient material (5, 15) to define a passive radial magnetic bearing, coils (6, 16) associated with magnetic armatures (10, 20) and facing rotor parts (7, 17) being located perpendicularly to the rotor (1), and axial sensors (60, 160) configured for sensing the axial position of the rotor (1) and control means (200) configured for feeding the coils (6, 16) as a function of the outputs of the axial sensors (60, 160) for generating both axial bearing forces and a motor torque and thereby being adapted for defining an axial bearingless motor.

13 Claims, 4 Drawing Sheets

(51) Int. Cl.
  *H02K 7/09* (2006.01)
  *F04D 25/16* (2006.01)
(52) U.S. Cl.
  CPC ...... *F16C 32/0478* (2013.01); *F16C 32/0495* (2013.01); *H02K 7/09* (2013.01); *F16C 2360/24* (2013.01); *F16C 2360/42* (2013.01); *F16C 2360/44* (2013.01)
(58) Field of Classification Search
  USPC .......................................................... 464/29
  See application file for complete search history.

(56) References Cited

U.S. PATENT DOCUMENTS

| | | | |
|---|---|---|---|
| 2008/0185928 A1* | 8/2008 | Buhler | F16C 3/02 310/90.5 |
| 2009/0009017 A1* | 1/2009 | Miyagawa | F04D 29/051 310/90.5 |
| 2009/0015012 A1* | 1/2009 | Metzler | F01D 15/10 290/52 |

* cited by examiner

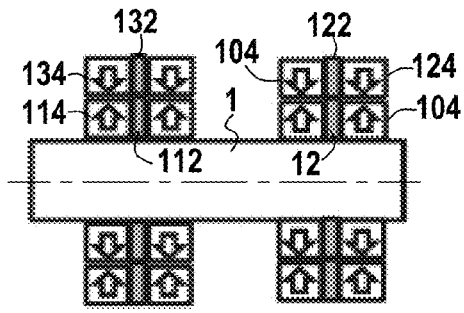
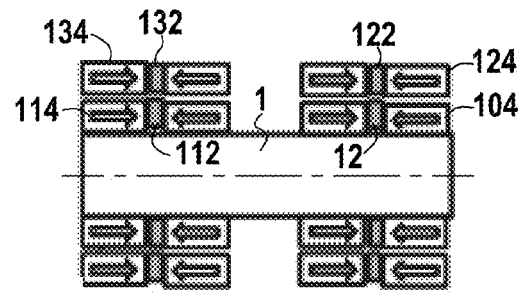
FIG.9  FIG.10
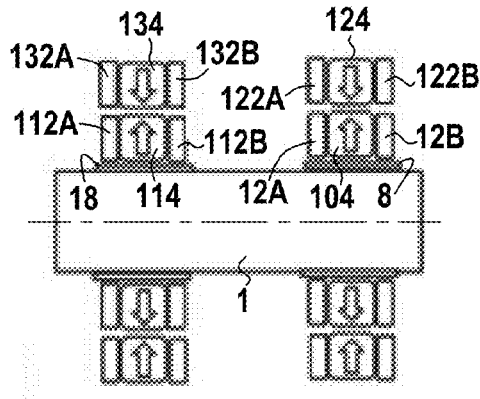
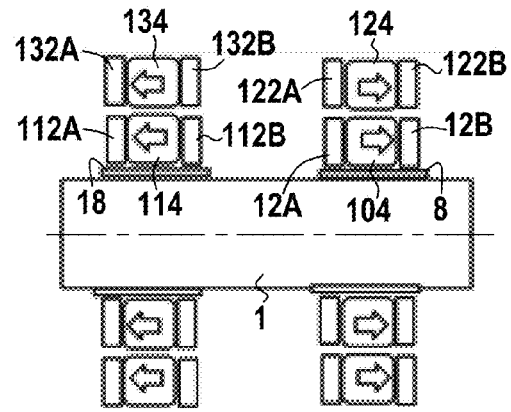
FIG.11  FIG.12
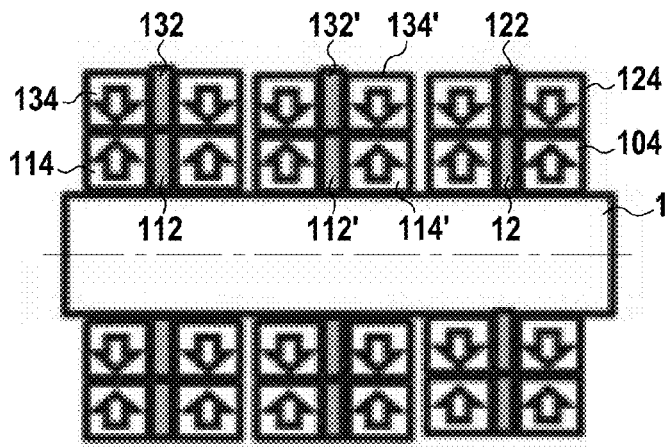
FIG.13

HYBRID MAGNETIC SUSPENSION OF A ROTOR

CROSS-REFERENCE TO RELATED APPLICATIONS

This applications claims priority to European Patent Application No. EP12306674 filed Dec. 26, 2012, the contents of which are herein fully incorporated by reference.

FIELD OF THE INVENTION

The present invention relates to a hybrid magnetic suspension of a rotor having a first compressor wheel at a first end thereof and a second compressor wheel at a second end thereof.

The invention applies more specifically but not exclusively to electrically assisted turbochargers, centrifugal moto-compressors, tandem moto-compressors, such as compact electric compressors which are adapted to be used in a Heat Ventilation Air Conditioning (HVAC) installation for vehicles.

The vehicles may include in particular terrestrial vehicles such as hybrid electric vehicles (HEV) or electric vehicles (EV) as well as aircrafts or other kinds of vehicles.

BACKGROUND OF THE INVENTION

Conventional Electric compressors, such as HVAC compressors for vehicles are typically associated with an electric motor.

An example of such electric motor driven compressor is given in patent document U.S. Pat. No. 6,183,215 B1.

Such types of electric motor driven compressors have many drawbacks linked to lubrication, refrigerants, low operating speed, friction losses and loss of compactness.

Two main categories of HVAC electric compressors are used in HEV/EV vehicles: rotary like vane compressors and oscillating like scroll type compressors.

Both types of electric compressors which are associated with an electric motor have the following drawbacks:
  Lubricants are needed for different mechanical parts,
  It is necessary to check compatibility of lubricant oil with refrigerants (such as for example the haloalkane refrigerant R134a or the more recently used hydrofluoroolefin refrigerant HFO-1234yf),
  Lubricants should be carefully chosen to protect the electric motor windings from the risk of insulation failure,
  An oil separator and leak detection devices are required to avoid contamination of the electric systems in EV/HEV vehicles,
  The conventional electric compressors have a speed which is limited and cannot exceed 10,000 rpm,
  Friction losses are detrimental to the operation of the electric compressor.

Furthermore patent document US 2002/0040581 A1 discloses an exhaust gas turbocharger for an internal combustion engine having an exhaust gas turbine arranged in an exhaust gas line, and a compressor arranged in an intake duct and connected to the turbine by way of a shaft, the compressor including a compressor wheel forming at the same time a rotor of an electric motor.

Patent document EP 1201891 A1 further discloses a turbocharger with electrical assistance which uses a wheel of the turbocharger as induction motor rotor with windings to create a magnetic field.

SUMMARY OF THE INVENTION

Therefore, it is desired to provide a suspension arrangement of a rotor and an electric compressor which can solve most of these problems.

The invention is intended more especially, although not exclusively, to automotive air conditioning applications and therefore further aims at providing an electric compressor which takes into account the high level of vibrations generated in a vehicle and which is as compact as possible.

The invention more specifically aims at providing a suspension for a rotor which does not increase the length or the mass of the rotor and therefore has no detrimental impact concerning rotor dynamics.

Moreover the invention aims at providing a cost effective, maintenance free and low friction suspension system which does not need landing bearings contrary to active magnetic suspensions which are operable in five axis.

The invention is defined in the appended claims.

The invention relates to a hybrid magnetic suspension of a rotor having a first compressor wheel at a first end thereof and a second compressor wheel at a second end thereof, wherein it comprises:
  at least first and second sets of permanent magnets integral to first and second shrinked rings arranged on the rotor in the vicinity of the first and second compressor wheels respectively, the first and second sets of permanent magnets being retained by an outer non-magnetic ring coaxial with the rotor,
  at least third and fourth sets of permanent magnets integral to first and second stationary rings coaxially arranged with the rotor and associated with a resilient material in the vicinity of the first and second compressor wheels respectively, so that the third and fourth sets of permanent magnets are facing the first and second sets of permanent magnets respectively whilst providing a gap there-between to define a passive radial magnetic bearing,
  at least first and second coils associated with first and second magnetic armatures respectively and respectively facing first and second rotor parts being located perpendicularly to the rotor, and
  axial sensors configured for sensing the axial position of the rotor and control means configured for feeding the first and second coils as a function of the outputs of the axial sensors for generating both axial bearing forces and a motor torque and thereby being adapted for defining an axial bearingless motor.

Since the passive radial magnetic bearings are not totally stable, the axial bearingless motor, in addition to its normal function, acts as a stabilizer and the resilient material acts as a damping support.

According to a particular embodiment, each permanent magnet includes at least one insert made of an electrically conductive material, such as copper or aluminum for example.

The inserts made of an electrically conductive material reduce the axial deviation. When a deviation occurs, i.e. if the rotor and the stator are not centered and there is a variation of the airgap, the magnetic field variation is no longer zero and opposite currents (fields) are induced in the inserts thus stabilizing the forces.

According to a specific embodiment, the insert made of an electrically conductive material is located in a center position between two individual permanent magnets of the same type in a direction along a longitudinal axis of the rotor.

According to another possible embodiment, two inserts made of an electrically conductive material are located at both sides of an individual permanent magnet in a direction along a longitudinal axis of the rotor.

According to a specific embodiment, the first and second shrinked rings are constituted by a single hollow cylinder.

According to another possible embodiment, the first and second shrinked rings are designed to define a thermal barrier.

The axial bearingless motor may comprise first and second rotor parts each made of a part chosen among a part made of an electrically conductive and magnetic alloy for defining an induction motor, a part made of a permanent magnet for defining a permanent magnet motor, or a part made of a hard magnetic material for defining a hysteresis motor or a reluctance motor.

According to a particular embodiment which is more specifically adapted to a tandem moto-compressor, such as a heat ventilation air conditioning system for vehicles (HVAC), the first and second rotor parts are respectively located on first and second front faces of the first and second compressor wheels.

According to another particular embodiment which is more specifically adapted to an electrically-assisted turbocharger, the first and second rotor parts are respectively located on first and second front faces of a disc which is integrally located perpendicularly to the rotor between the first and second compressor wheels.

BRIEF DESCRIPTION OF THE DRAWINGS

FIG. 9 and FIG. 10 are schematic lateral views of a rotor showing two possible ways of arranging permanent magnets with electrically conductive inserts thereon;

FIG. 11 and FIG. 12 are schematic lateral views of a rotor showing two other possible ways of arranging permanent magnets with electrically conductive inserts thereon; and FIG. 13 is a schematic lateral view of a rotor showing an example of arrangement of more than two rings of permanent magnets with electrically conductive inserts thereon.

DESCRIPTION OF THE PREFERRED EMBODIMENTS

The present invention will be described in connection with preferred embodiments which are given by way of examples.

Figure 1:
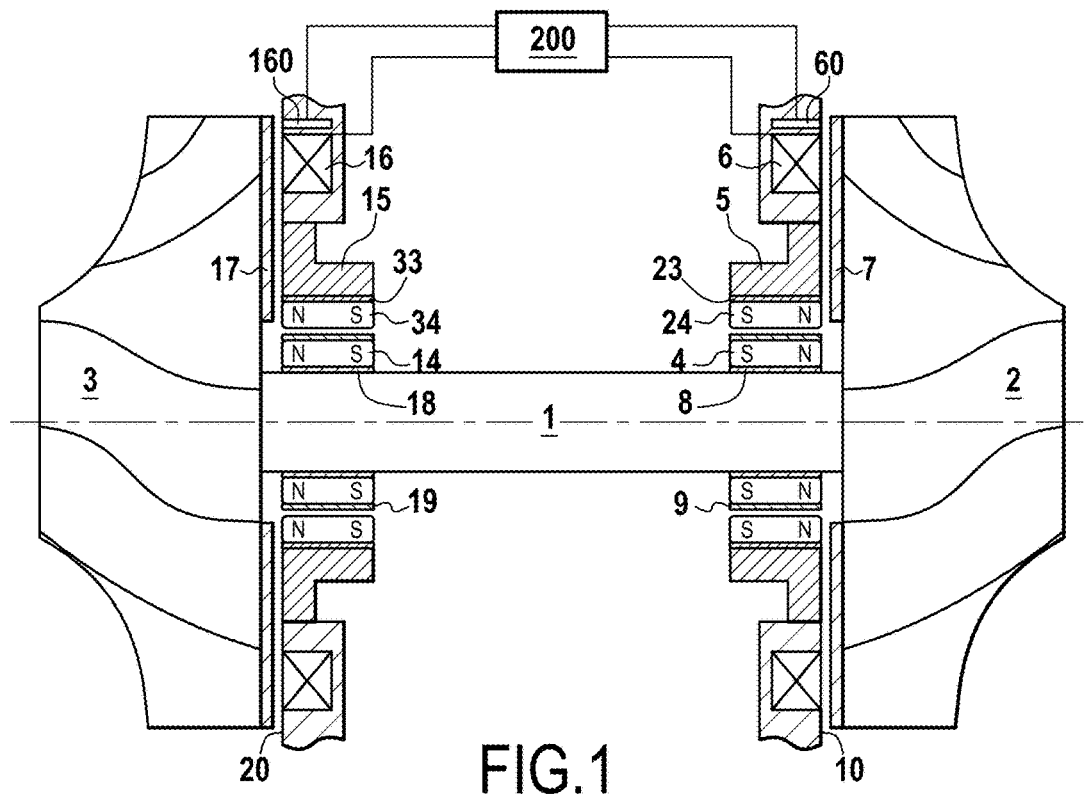
FIG. 1 is a schematic longitudinal sectional view of a tandem compressor according to a first embodiment of the invention.

FIG. 1 shows an example of a tandem compressor equipped with a hybrid magnetic suspension according to the invention. Such tandem compressor may be used for example for a heat ventilation air conditioning (HVAC) system which may be dedicated for hybrid electric vehicles (HEV) or electric vehicles (EV) or else for aircrafts or other types of vehicles.

A rotor shaft 1 is coupled to a first compressor wheel 2 at a first end thereof and to a second compressor wheel 3 at a second end thereof.

An axial bearingless motor comprises rotor parts 7, 17 which are located perpendicularly to the rotor shaft 1 and in the embodiment of FIG. 1 are more specifically located on the front faces of the first and second compressor wheels 2, 3 respectively. The rotor parts 7, 17 may each be made of a part chosen among a part made of an electrically conductive and magnetic alloy for defining an induction motor, a part made of a permanent magnet for defining a permanent magnet motor, or a part made of a hard magnetic material for defining a hysteresis motor or a reluctance motor. The axial bearingless motor further comprises a stator comprising magnetic armatures 10, 20 and windings 6, 16 facing the respective rotor parts 7, 17.

Generally speaking an axial bearingless motor comprises a rotor portion such as 7, 17 having a plurality of pole pairs armatures and stator portions each comprising a core 10, 20 with slots respectively for receiving windings 6, 16 configured to impress a motor torque and an axial bearing force, the stator portions being located opposite the rotor portions 7, 17 respectively. The cores 10, 20 may comprise a laminated magnetic iron stack or a magnetic composite.

In the stator portions of the axial bearingless motor each coil 6, 16 may comprise separated windings used to impress the bearing force (annular coils centered on the axis of the shaft 1) and the motor torque (a monophasic or polyphasic winding arrangement within a plurality of slots made in the cores 10, 20).

Alternatively the needed bearing force and motor torque may be generated in each coil 6, 16 by combined windings. In such a case a single coil 6, 16 in each stator portion will carry jointly the required motor and bearing ampere-turns.

A plurality of pole pairs of armatures may be used by way of example. However the rotor parts 7, 17 may carry different structural elements depending on the chosen principle (permanent magnet, induction, switched reluctance, and hysteresis).

First and second passive radial magnetic bearings are located on the vicinity of the compressor wheels 2, 3 to support the shaft 1 in levitation during functional operation of the compressor. Each passive radial magnetic bearing comprises permanent magnets fastened with the shaft 1 and permanent magnets which are stationary.

More specifically as shown in FIG. 1, the passive radial magnetic bearings comprise:

at least first and second sets of permanent magnets 4, 14 integral to first and second rings 8, 18 shrunk fit onto the rotor shaft 1 in the vicinity of the first and second compressor wheels 2, 3 respectively, the first and second sets of permanent magnets 4, 14 being retained by an outer non-magnetic ring 9, 19 coaxial with the rotor shaft 1, at least third and fourth sets of permanent magnets 24, 34 integral to first and second stationary rings 23, 33 coaxially arranged with the rotor shaft 1 and associated with a resilient material 5, 15 in the vicinity of the first and second compressor wheels 2, 3 respectively, so that the third and fourth sets of permanent magnets 24, 34 are facing the first and second sets of permanent magnets 4, 14 respectively whilst providing a gap there-between to define a passive radial magnetic bearing.

The shaft 1 is levitated in a contactless manner due to the radial magnetic bearings. Since the passive magnetic bearings are not totally stable, the axial bearingless motor acts as a stabilizer and the resilient material 5, 15 acts as a damping support. The resilient material 5, 15 may be for example shrunk fit into the permanent magnets 24, 34 or glued thereon.

The shaft's axial position is monitored by sensors 60, 160, e.g. of the variable inductive type, which detect any deviation from nominal position and emit signals which are used in a control system 200 to command currents in the windings 6, 16 of the axial bearingless motor in order to bring the shaft 1 back to its nominal position.

Due to the implementation of passive magnetic bearings together with an axial bearingless motor and resilient means 5, 15 auxiliary landing bearings are not necessary for supporting the shaft 1.

The casing or flanges and cooling systems with a refrigerant which are associated with the compressor are conventional.

In the passive magnetic bearings the force is constituted by repulsion between oppositely directed magnets 4, 24 or 14, 34. The rotor magnets 4, 14 constituting one part of a passive magnetic bearing may be ring shape mounted on a ring 8, 18 supporting the magnets, such ring 8, 18 being shrunk fitted onto the rotor shaft 1.

Figure 5:
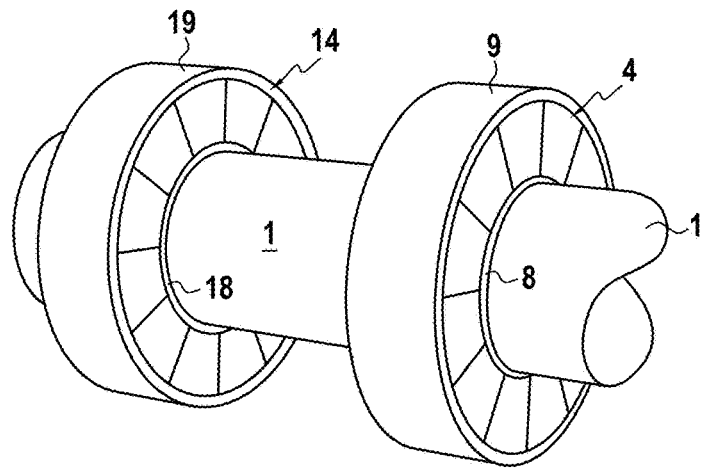
FIG. 5 is a perspective view of a rotor showing a possible way of mounting permanent magnets thereon.

Alternatively, as shown in FIG. 5, a single hollow cylinder 8 shrunk fitted onto the rotor shaft 1 may be used for mounting the rotor magnets 4, 14 of both passive magnetic radial bearings.

Figure 6:
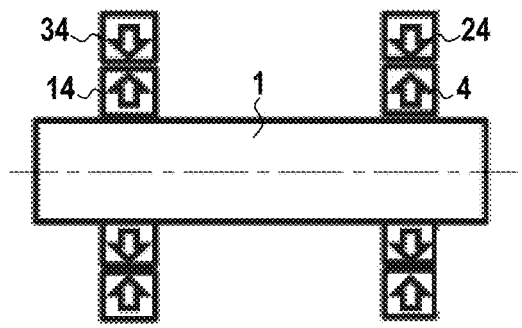
FIG. 6 and FIG. 7 are schematic lateral views of a rotor showing two possible ways of arranging permanent magnets thereon.
Figure 7:
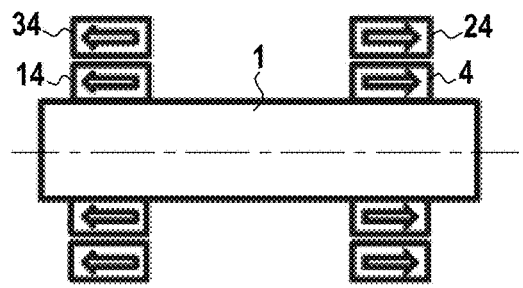

Different repulsion configurations of the permanent magnets 4, 24 and 14, 34 may be adopted as shown in FIGS. 6 and 7 where the directions of magnetization may be either perpendicular (FIG. 6) or parallel (FIG. 7) to the axis of the rotor shaft 1.

Figure 8:
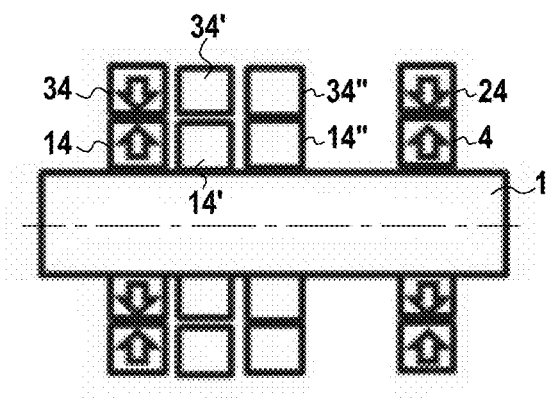
FIG. 8 is a schematic lateral view of a rotor showing an example of arrangement of more than two rings of permanent magnets thereon.

In addition to two basic passive radial magnetic bearings 4, 24 and 14, 34 located in the vicinity of the compressor wheels 2, 3, it is possible to add some further passive radial magnetic bearings 14', 34'; 14", 34" along the rotor shaft 1 (see FIG. 8), since the force corresponds to exposed surface and a plurality of more than two passive radial magnetic bearings increases the forces created by the passive magnetic bearings.

Figure 2:
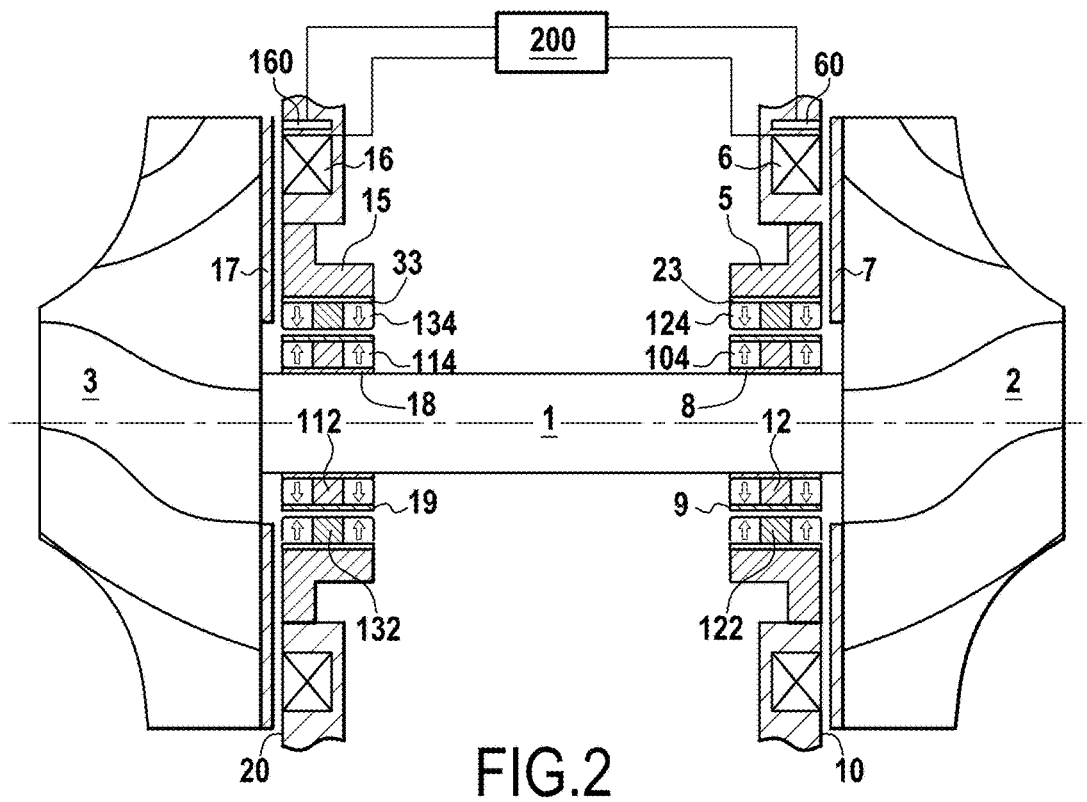
FIG. 2 is another schematic longitudinal sectional view of a tandem compressor according to a second embodiment of the invention.

FIG. 2 illustrates a variant embodiment which is similar to the embodiment of FIG. 1 but has slightly different passive magnetic radial bearings.
The elements which are common to the embodiments of FIGS. 1 and 2 bear the same reference numerals and will not be described again.

In the embodiment of FIG. 2 inserts of an electrically conductive material, such as copper or aluminum, are combined with the different permanent magnets. Thus inserts 12, 112, 122, 132 of an electrically conductive material are inserted in the middle of permanent magnets 104, 114, 124, 134 respectively as shown in FIG. 2. The electrically conductive material reduces the axial deviation created when repulsion occurs between oppositely directed magnets. Thus when a deviation occurs due to a variation of the airgap when the rotor and the stator are not centered, the magnetic field variation is no longer zero and opposite currents (and magnetic fields) are induced in the inserts 12, 112, 122, 132 thus stabilizing the forces.

As mentioned above different repulsion configurations of the permanent magnets 104, 124 and 114, 134 may be adopted as shown in FIGS. 9 and 10 where the directions of magnetization may be either perpendicular (FIG. 9) or parallel (FIG. 10) to the axis of the rotor shaft 1. The provision of inserts 12, 112, 122, 132 of electric conductive material does not change the fact that different configurations are possible.

In addition to two basic passive radial magnetic bearings 104, 124 and 114, 134 located in the vicinity of the compressor wheels 2, 3, it is possible to add some further passive radial magnetic bearings 114', 134' along the rotor shaft 1 (see FIG. 13), since the force corresponds to exposed surface and a plurality of more than two passive radial magnetic bearings increases the forces created by the passive magnetic bearings.

In the examples of FIGS. 2, 9, 10 and 13 the inserts 12, 112, 122, 132 of electric conductive material are located in the middle of permanent magnets, i.e. two identical permanent magnets 104, 114, 124, 134 are located on both sides of the central insert 12, 112, 122, 132 of electrically conductive material in the direction of the longitudinal axis of the rotor shaft. However as shown in FIGS. 11 and 12 other configurations are possible.

Thus in the examples of FIGS. 11 and 12 the permanent magnets 104, 114, 124, 134 are located in the middle and two identical elements of electrically conductive material 12A, 12B, 112A, 112B, 122A, 122B, 132A, 132B are located on both sides of the central permanent magnet 104, 114, 124, 134 in the direction of the longitudinal axis of the rotor shaft.

In the embodiment of FIG. 2, the rotor magnets 104, 114 constituting one part of a passive magnetic bearing may be ring shape mounted on a ring 8, 18 supporting the magnets, such ring 8, 18 being shrunk fitted onto the rotor shaft 1 or as stated above with respect to FIG. 5, alternatively a single hollow cylinder 8 shrunk fitted onto the rotor shaft 1 may be used for mounting the rotor magnets 104, 114 of both passive magnetic radial bearings.

The third and fourth sets of permanent magnets 24, 34 may be arranged so that they are integral to first and second stationary rings 23, 33 respectively. However according to a variant embodiment, the third and fourth sets of permanent magnets 24, 34 could be integral to the first and second rings of resilient material 5, 15, i.e. the stationary rings 23, 33 could be combined with the first and second rings of resilient material 5, 15.

Figure 3:
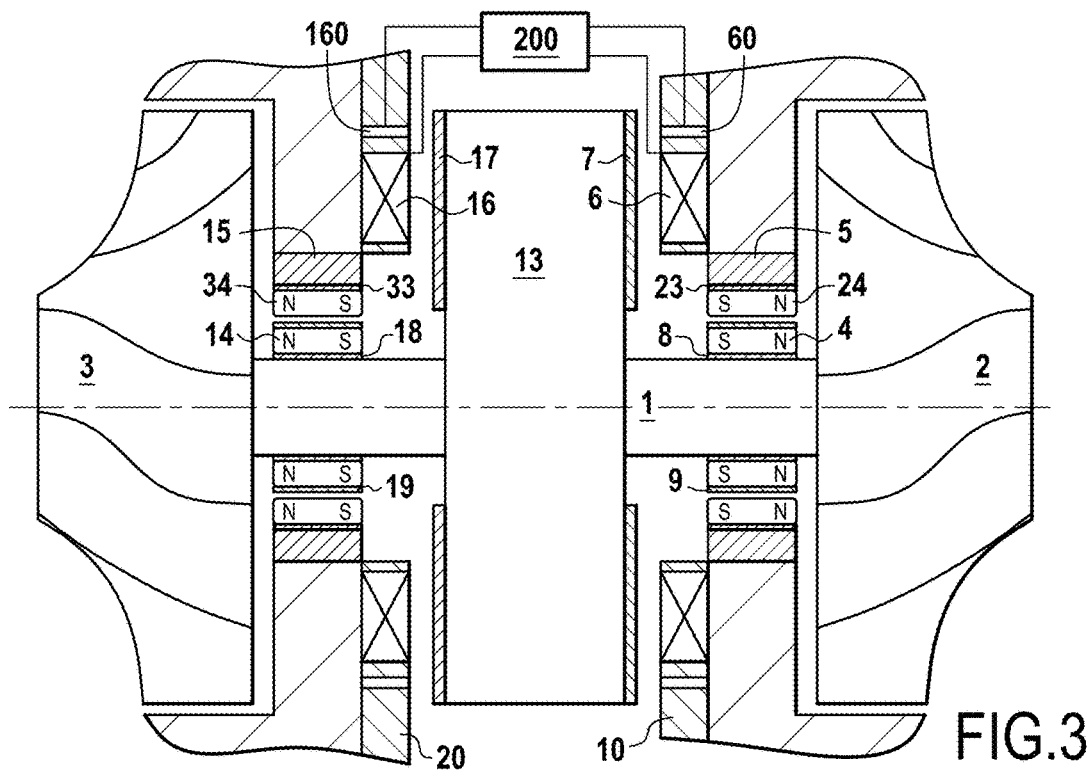
FIG. 3 is another schematic longitudinal sectional view of a turbocharger according to a third embodiment of the invention.
Figure 4:
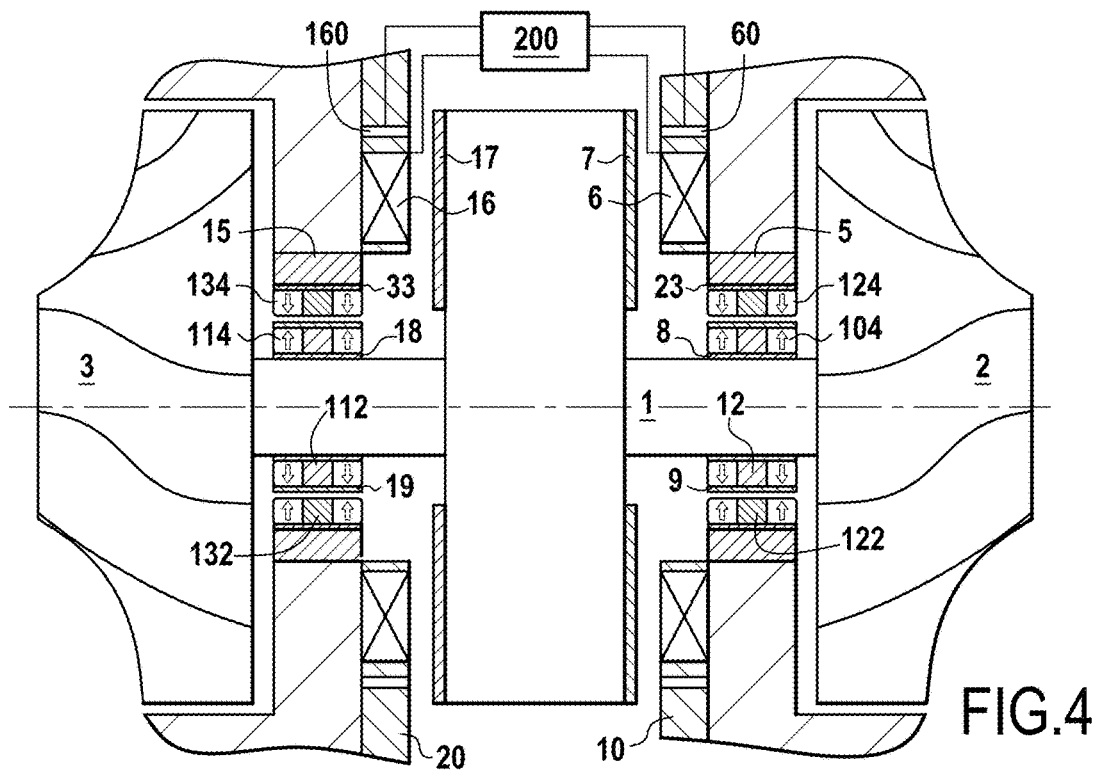
FIG. 4 is another schematic longitudinal sectional view of a turbocharger according to a fourth embodiment of the invention.

FIGS. 3 and 4 relate to further embodiments of the invention which may be applied in particular to a turbocharger. The elements which are common to the embodiments of FIGS. 1 and 2 bear the same reference numerals and will not be described again.

Basically the passive radial magnetic bearing of FIG. 3 may be identical to the passive radial magnetic bearing of FIG. 1 and will not be described again. Similarly the passive radial magnetic bearing of FIG. 4 may be identical to the passive radial magnetic bearing of FIG. 2 with inserts of electrically conductive material 12, 112, 122, 132 and will not be described again. The features previously described with reference to FIGS. 5 to 8 may also be applied to the embodiment of FIG. 3 whereas the features previously described with reference to FIGS. 9 to 13 may also be applied to the embodiment of FIG. 4.

In the embodiments of FIGS. 3 and 4, the first and second rotor parts 7, 17 of the axial bearingless motor are not located on front faces of the compressor wheels 2, 3 but are respectively located on first and second front faces of a disc 13 which is integrally located perpendicularly to the rotor shaft 1 between the first and second compressor wheels 2, 3.

The first and second coils 6, 16 and the corresponding sensors 60, 160, which are associated with first and second stationary magnetic armatures 10, 20 respectively are respectively facing the rotor parts 7, 17 which are located on the two front faces of the disc 13.

The control unit 200 receives the outputs from the axial sensors 60, 160 and feeds the coils 6, 16 which serve as active axial bearing and may also create the motor torque as previously described.

FIGS. 1 to 4 show two single wheels 2, 3. However other designs of the compressor portion may be used in combination with the different embodiments disclosed herein. Thus each compressor wheel 2, 3 may include double wheels if necessary, i.e. the invention may also apply to a compressor portion including double tandem wheels.

Although preferred embodiments have been shown and described, it should be understood that any changes and modifications may be made therein without departing from the scope of the invention as defined in the appended claims.

The invention claimed is:

1. A hybrid magnetic suspension of a rotor having a first compressor wheel at a first end thereof and a second compressor wheel at a second end thereof, comprising:
   a passive radial magnetic bearing comprising:
      at least first and second sets of permanent magnets integral to first and second rings shrunk fit onto the rotor in a vicinity of the first and second compressor wheels, the first and second sets of permanent magnets being retained by an outer non-magnetic ring coaxial with the rotor,
      at least third and fourth sets of permanent magnets integral to first and second stationary rings coaxially arranged with the rotor and associated with a resilient material in the vicinity of the first and second compressor wheels, the third and fourth sets of permanent magnets facing the first and second sets of permanent magnets respectively while providing a gap there-between to define the passive radial magnetic bearing; and
   an axial bearingless motor comprising:
      at least first and second coils respectively associated with first and second magnetic armatures and respectively facing first and second rotor parts located perpendicularly to the rotor,
      axial sensors configured for sensing an axial position of the rotor and providing outputs,
      wherein commanding currents are received in the at least first and second coils as a function of the outputs of the axial sensors,
   wherein each magnet of the first, second, third, and fourth sets of permanent magnets includes at least one insert made of an electrically conductive material,
   wherein the passive radial magnetic bearing and the axial bearingless motor exclude an implementation of auxiliary landing bearings.

2. The hybrid magnetic suspension according to claim 1, wherein the electrically conductive material comprises aluminum or copper.

3. The hybrid magnetic suspension according to claim 1, wherein the at least one insert is located in a center position between a pair of two individual permanent magnets, in a direction along a longitudinal axis of the rotor, the pair of two individual permanent magnets respectively being from the first and second sets of permanent magnets or from the third and fourth sets of permanent magnets.

4. The hybrid magnetic suspension according to claim 1, wherein the at least one insert comprises two inserts made of the electrically conductive material, the two inserts being located at both sides of an individual permanent magnet in a direction along a longitudinal axis of the rotor, the individual permanent magnet being a magnet from the first, the second, the third, or the fourth sets of permanent magnets.

5. The hybrid magnetic suspension according to claim 1, wherein the first and second shrunk fitted rings are constituted by a single hollow cylinder.

6. The hybrid magnetic suspension according to claim 1, wherein the first and second shrunk fit rings define a thermal barrier.

7. The hybrid magnetic suspension according to claim 1, wherein the axial bearingless motor further comprises the first and second rotor parts, each of the first and second rotor parts being a part made of an electrically conductive and magnetic alloy for defining an induction motor, a part made of a permanent magnet for defining a permanent magnet motor, or a part made of a hard magnetic material for defining a hysteresis motor or a reluctance motor.

8. The hybrid magnetic suspension according to claim 1, wherein the first and second rotor parts are respectively located on first and second front faces of the first and second compressor wheels.

9. The hybrid magnetic suspension according to claim 1, wherein the first and second rotor parts are respectively located on first and second front faces of a disc which is integrally located perpendicularly to the rotor between the first and second compressor wheels.

10. A tandem moto-compressor comprising:
   a hybrid magnetic suspension having;
      a passive radial magnetic bearing comprising:
         at least first and second sets of permanent magnets integral to first and second rings shrunk fit onto a rotor in a vicinity of first and second compressor wheels, the first and second sets of permanent magnets being retained by an outer non-magnetic ring coaxial with the rotor,
         at least third and fourth sets of permanent magnets integral to first and second stationary rings coaxially arranged with the rotor and associated with a resilient material in the vicinity of the first and second compressor wheels, the third and fourth sets of permanent magnets facing the first and second sets of permanent magnets respectively while providing a gap there-between to define the passive radial magnetic bearing; and
      an axial bearingless motor comprising:
         at least first and second coils respectively associated with first and second magnetic armatures and respectively facing first and second rotor parts located perpendicularly to the rotor,
         axial sensors configured for sensing an axial position of the rotor and providing outputs,
         wherein commanding currents are received in the at least first and second coils as a function of the outputs of the axial sensors,
   wherein the first and second rotor parts are respectively located on first and second front faces of the first and second compressor wheels, and
   wherein each magnet of the first, second, third, and fourth sets of permanent magnets includes at least one insert made of an electrically conductive material,
   wherein the passive radial magnetic bearing and the axial bearingless motor exclude an implementation of auxiliary landing bearings.

11. An electrically assisted turbocharger comprising:
a hybrid magnetic suspension having;
- a passive radial magnetic bearing comprising:
  - at least first and second sets of permanent magnets integral to first and second rings shrunk fit onto a rotor in a vicinity of first and second compressor wheels, the first and second sets of permanent magnets being retained by an outer non-magnetic ring coaxial with the rotor,
  - at least third and fourth sets of permanent magnets integral to first and second stationary rings coaxially arranged with the rotor and associated with a resilient material in the vicinity of the first and second compressor wheels, the third and fourth sets of permanent magnets facing the first and second sets of permanent magnets respectively while providing a gap there-between to define the passive radial magnetic bearing; and
- an axial bearingless motor comprising:
  - at least first and second coils respectively associated with first and second magnetic armatures and respectively facing first and second rotor parts located perpendicularly to the rotor,
  - axial sensors configured for sensing an axial position of the rotor and providing outputs,
  - wherein commanding currents are received in the at least first and second coils as a function of the outputs of the axial sensors, and
wherein the first and second rotor parts are respectively located on first and second front faces of the first and second compressor wheels, and
wherein each magnet of the first, second, third, and fourth sets of permanent magnets includes at least one insert made of an electrically conductive material,
wherein the passive radial magnetic bearing and the axial bearingless motor exclude an implementation of auxiliary landing bearings.

12. A centrifugal moto-compressor comprising:
a hybrid magnetic suspension having;
- a passive radial magnetic bearing comprising:
  - at least first and second sets of permanent magnets integral to first and second rings shrunk fit onto a rotor in a vicinity of first and second compressor wheels, the first and second sets of permanent magnets being retained by an outer non-magnetic ring coaxial with the rotor,
  - at least third and fourth sets of permanent magnets integral to first and second stationary rings coaxially arranged with the rotor and associated with a resilient material in the vicinity of the first and second compressor wheels, the third and fourth sets of permanent magnets facing the first and second sets of permanent magnets respectively while providing a gap there-between to define the passive radial magnetic bearing; and
- an axial bearingless motor comprising:
  - at least first and second coils respectively associated with first and second magnetic armatures and respectively facing first and second rotor parts located perpendicularly to the rotor,
  - axial sensors configured for sensing an axial position of the rotor and providing outputs,
  - wherein commanding currents are received in the at least first and second coils as a function of the outputs of the axial sensors,
wherein each magnet of the first, second, third, and fourth sets of permanent magnets includes at least one insert made of an electrically conductive material,
wherein the passive radial magnetic bearing and the axial bearingless motor exclude an implementation of auxiliary landing bearings.

13. An electric compressor for a vehicle heat ventilation air conditioning system comprising:
a hybrid magnetic suspension having;
- a passive radial magnetic bearing comprising:
  - at least first and second sets of permanent magnets integral to first and second rings shrunk fit onto a rotor in a vicinity of first and second compressor wheels compressor wheels, the first and second sets of permanent magnets being retained by an outer non-magnetic ring coaxial with the rotor, rotor;
  - at least third and fourth sets of permanent magnets integral to first and second stationary rings coaxially arranged with the rotor and associated with a resilient material in the vicinity of the first and second compressor wheels, the third and fourth sets of permanent magnets facing the first and second sets of permanent magnets respectively while providing a gap there-between to define the passive radial magnetic bearing; and
- an axial bearingless motor comprising:
  - at least first and second coils respectively associated with first and second magnetic armatures and respectively facing first and second rotor parts located perpendicularly to the rotor,
  - axial sensors configured for sensing an axial position of the rotor and providing outputs,
  - wherein commanding currents are received in the at least first and second coils as a function of the outputs of the axial sensors,
wherein each magnet of the first, second, third, and fourth sets of permanent magnets includes at least one insert made of an electrically conductive material,
wherein the passive radial magnetic bearing and the axial bearingless motor exclude an implementation of auxiliary landing bearings.

* * * * *